(12) United States Patent
Solak

(10) Patent No.: US 7,886,483 B2
(45) Date of Patent: Feb. 15, 2011

(54) CHRISTMAS-TREE STAND WITH WATER-LEVEL-DETECTING CIRCUITRY PROVIDING FLASHER OUTLET AND RECORDABLE SOUND PLAYBACK

(76) Inventor: David M. Solak, 4805 Maple Hill Dr., Seven Hills, OH (US) 44131-5916

( * ) Notice: Subject to any disclaimer, the term of this patent is extended or adjusted under 35 U.S.C. 154(b) by 1848 days.

(21) Appl. No.: 10/894,902

(22) Filed: Jul. 21, 2004

(65) Prior Publication Data

US 2007/0157511 A1    Jul. 12, 2007

(51) Int. Cl.
*A01G 27/00* (2006.01)
(52) U.S. Cl. ........................................... 47/40.5
(58) Field of Classification Search ............... 47/40.5, 47/48.5; 116/227
See application file for complete search history.

(56) References Cited

U.S. PATENT DOCUMENTS

| | | | |
|---|---|---|---|
| 4,040,436 A * | 8/1977 | Caldwell | 137/78.3 |
| 4,441,860 A | 4/1984 | Tsujimoto | |
| 4,796,017 A | 1/1989 | Merenda | |
| 5,450,067 A | 9/1995 | Wang | |
| 5,744,715 A * | 4/1998 | Gerome | 73/432.1 |
| 6,087,946 A | 7/2000 | Menard, Jr. | |
| 6,145,755 A * | 11/2000 | Feltz | 239/1 |
| 6,405,480 B1 * | 6/2002 | Martin | 47/57.5 |
| 6,997,642 B2 * | 2/2006 | Bishop, Jr. | 405/37 |
| 7,110,862 B2 * | 9/2006 | Park | 700/284 |
| 2002/0017055 A1 * | 2/2002 | Nalbandian et al. | 47/48.5 |

* cited by examiner

*Primary Examiner*—Son T. Nguyen
(74) *Attorney, Agent, or Firm*—Curatolo Sidoti Co., LPA; Peter R. Detorre; Salvatore A. Sidoti

(57) ABSTRACT

An electronic device to warn of low water level, particularly in a Christmas tree water reservoir base. A flashing unit provides an affect to an outlet where the strand of lights on the tree or another lighted device will turn on and off until the water is filled into the base again. A message will be played at intervals. The message is recorded by pressing a button then speaking into a microphone. Messages are limited only to the human imagination. The lights will stop flashing and the message will stop playing when the water is filled into the reservoir base. The circuitry is housed separately away from the base to prevent shock.

6 Claims, 3 Drawing Sheets

CHRISTMAS-TREE STAND WITH WATER-LEVEL-DETECTING CIRCUITRY PROVIDING FLASHER OUTLET AND RECORDABLE SOUND PLAYBACK

FIELD OF INVENTION

This invention is intended to alarm by flashing the tree lights or other lighted devices and sound a message recorded by the consumer of the invention when the water level in the Christmas tree reservoir drops below a determined level. Many times the water in the Christmas tree drops due to healthy propagation efforts by the plant. However, since the tree has been cut of its roots, the tree can only live a short time after it is harvested. It is important to keep the water filled in the tree reservoir so the tree branches and needles do not dry out, hence the tree becoming a fire hazard.

DESCRIPTION OF PRIOR ART

There is an abundance of Christmas tree water level detectors and watering devices. None of the devices mentioned in this document and known on the date of this publication has the technical electronic outputs of this invention. U.S. Pat. No. 4,441,860 issued Apr. 10, 1984 to Tsujimoto is a float-type detecting unit. The unit detects fluids, but the patent does not integrate a final output or circuit controlled by the float switch. There is prior art in U.S. Pat. No. 5,450,067 issued Sep. 12, 1995 to Wang that is a water level indicating system. This patent intends to turn on visual lights, indicating different levels of the water. The invention described in this document intends to have two specific outputs; flashing the tree lights or any lighted object plugged into the flasher outlet, and sounding a message recorded by the consumer. U.S. Pat. No. 4,796,017 issued Jan. 3, 1989 to Merenda is a Christmas tree water level device that alarms when water is low but sounds a pulse driven signal that could mean an intermittent alarm like a car alarm or smoke detector. The invention cannot sound a recorded human voice however. Furthermore, the invention described and being applied for in this document can record any sound of reasonable decibel and play it back in infinite intervals depending on circuit design. The prior art of U.S. Pat. No. 5,522,179 issued Jun. 4, 1996 to Hollis shows a water level control system for Christmas trees. The invention being applied for and described in this document is not designed to control the level of water by adding water from a second reservoir. The intent of the invention being applied for in this document is to alarm visually, by flashing the tree lights or a light, and sounding a recorded message. It is up to the consumer of this invention to add the water when these alarms are given.

SUMMARY OF INVENTION

This invention will detect the water level in a Christmas tree reservoir base at two stages. The stages are full and empty. The tree appears as normal when the water in the reservoir is full. When the water is empty due to the tree absorbing water, this invention will trigger a flasher outlet and flash any electrical device plugged into it. The term flash can be defined as turning a light on and off until the water is filled back up again. This invention will flash the outlet and sound a message recorded by the consumer by pressing a button and speaking into a microphone. A message could be "It is time to fill the water". The messages are only limited to ones imagination and command of their language. The invention can record any sound within a reasonable decibel range. These messages will repeat in an interval depending on the design of the circuitry. Timing resistors control the intervals. The tree flashes the lights and sounds the message at the same time until the water is filled and a float switch turns off the current to the circuitry. The float switch activates the circuitry when the water is low. The current flowing through the float switch is direct and low. There is no risk of shock where the water and the float switch meet.

DETAILED DESCRIPTION OF THE DRAWINGS

Figure 1:
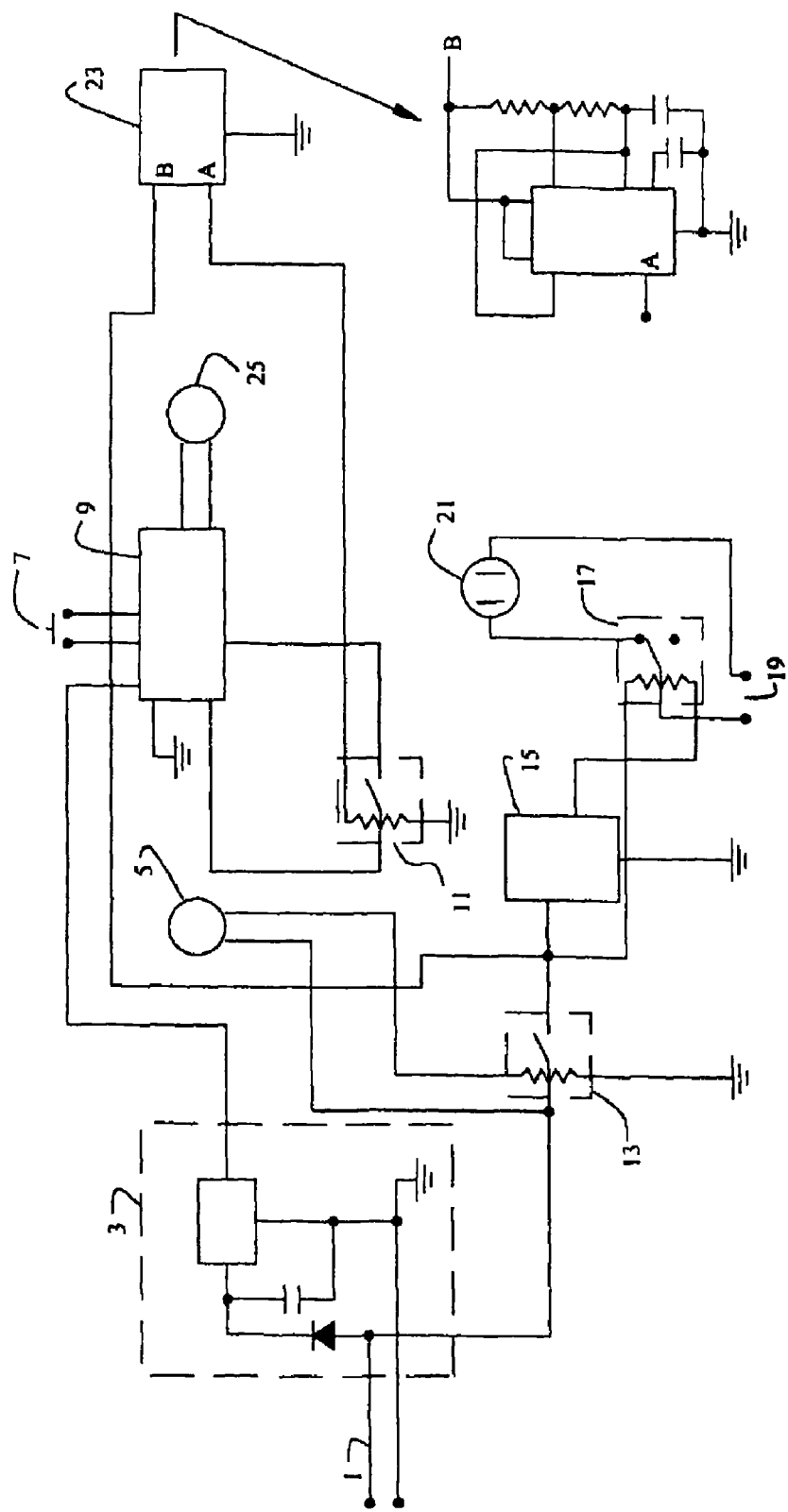
FIG. 1. Shows the full circuit with the timing schematic.
Figure 2A:
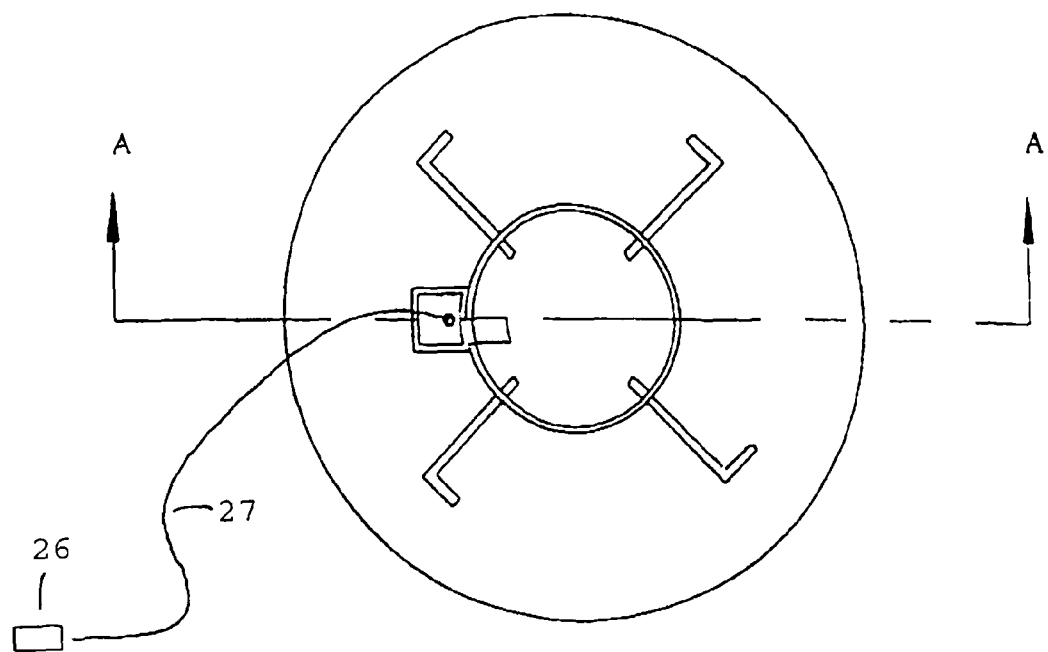
FIG. 2. Shows the water base with the float switch and it's chamber in the section view.
Figure 2B:
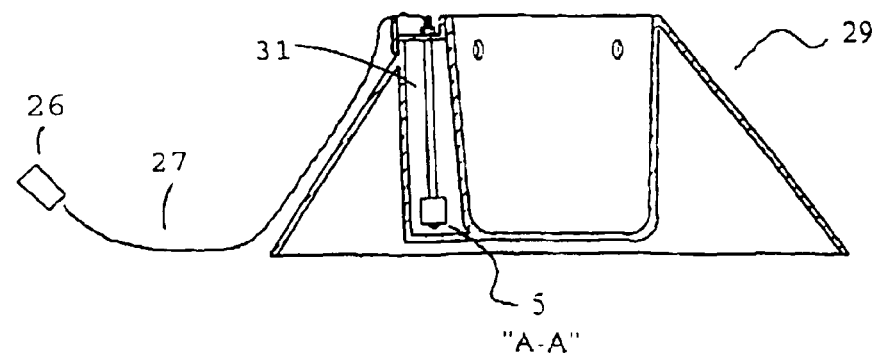
Figure 3:
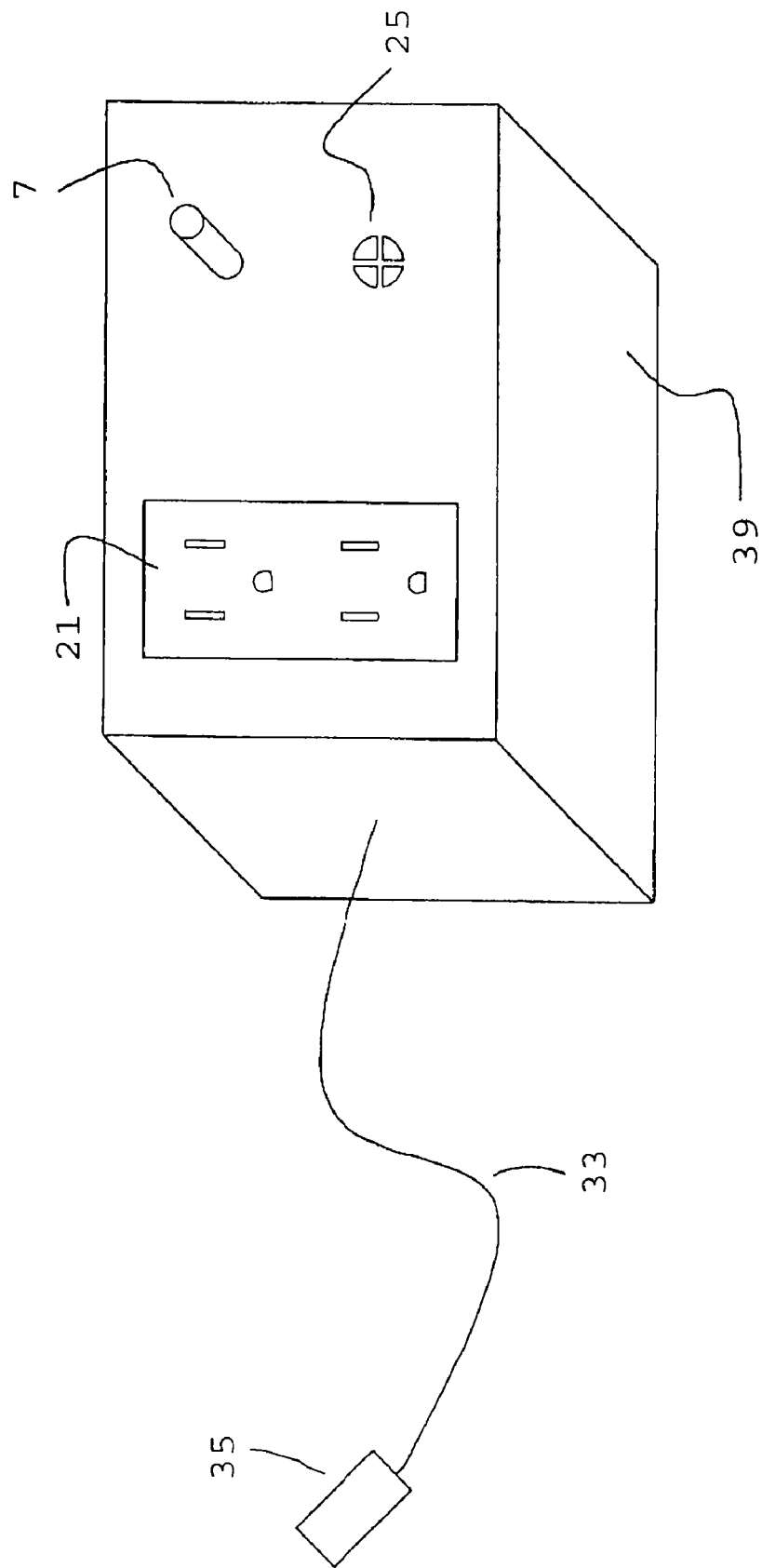
FIG. 3. Shows a possible housing design with the 110-120VAC outlet.

A power supply 1 with a voltage regulator circuit 3 provides current to the whole circuit. The regulator circuit 3 provides power to the voice recorder 9. A flashing unit 15 will begin to open and shut relay 17 when a float switch 5 closes relay 13 due to low water in the base 29. Relay 17 repetitively opens and closes a hot power lead 19 connected to an outlet 21. The float switch 5 also triggers a timing circuit 23 through electrical circuit B. The timing circuit 23 opens and closes relay 11 at a set interval provided by the timing circuit 23 through electrical circuit A. Relay 11 turns the voice recorder 9 on and off at an interval. A pushbutton 7 allows a message to be recorded on the voice recorder 9 through a microphone 25. A plug 26 and wire 27 lead connects the circuitry to the float switch 5 in the base 29. An opening 31 in the base 29 allows water to contact the float switch 5. A housing 39 will enclose the circuitry. A plug 35 and a wire 33 lead extend from the housing 39 to connect to plug 26 and wire 27 to electrically connect the circuitry to the float switch 5. A 110-120VAC outlet 21 allows for a strand of lights or light device to be plugged in.

The invention claimed is:
1. An electronic device for warning of low water in a tree base comprising:
   a voltage regulator circuit which receives electrical power from a power supply;
   a flasher unit;
   a timing circuit;
   a voice recorder;
   a microphone to record sound into the voice recorder;
   a float switch which triggers a first relay to activate the flasher unit and the timing circuit, wherein the flasher unit triggers a second relay which opens and closes a hot power lead connected to a flasher outlet within the electronic device;
   a lighting device in electrical connection with the flasher outlet within the electronic device;
   a voice recorder circuit activated by a third relay controlled by the timing circuit; and,
   a housing to enclose the circuitry and protect it from damage;
   wherein the float switch triggers the first relay which turns the flasher unit on when the water level in the tree base is low and off when the water level in the tree base is sufficient; wherein the flasher unit, powered by the closure of the first relay, triggers a second relay to periodically open and close causing a circuit containing the hot power lead to the flasher outlet to periodically open and close; wherein the float switch triggers the timing circuit which triggers the third relay to periodically open and close at a set interval, which triggers the voice recorder to periodically turn on and off to play back a recorded message when the water level in the tree base is low.

2. The electronic device of claim 1, wherein the flasher outlet controlled by the flasher unit, through the second relay, switches 110 to 120 VAC.

3. The electronic device of claim 1, comprising a record button which may be pressed to allow for the recording of a personalized message through the microphone into the voice recorder.

4. The electronic device of claim 1, wherein the float switch is located within the tree base and is electrically connected to the circuitry within the housing.

5. The electronic device of claim 1, wherein the base is for a Christmas-tree.

6. The electronic device of claim 1, wherein the lighting device is a strand of Christmas-tree lights.

* * * * *